(12) United States Patent
Kim

(10) Patent No.: US 9,472,803 B2
(45) Date of Patent: Oct. 18, 2016

(54) ELECTRODE ASSEMBLY COMPRISING FIBER-SHAPED STRUCTURES

(75) Inventor: Kwon Seok Kim, Seoul (KR)

(73) Assignee: JENAX INC., Busan (KR)

( * ) Notice: Subject to any disclaimer, the term of this patent is extended or adjusted under 35 U.S.C. 154(b) by 863 days.

(21) Appl. No.: 13/807,622

(22) PCT Filed: Jul. 1, 2011

(86) PCT No.: PCT/KR2011/004851
§ 371 (c)(1),
(2), (4) Date: Dec. 28, 2012

(87) PCT Pub. No.: WO2012/002769
PCT Pub. Date: Jan. 5, 2012

(65) Prior Publication Data
US 2013/0095367 A1  Apr. 18, 2013

(30) Foreign Application Priority Data
Jul. 2, 2010  (KR) .................. 10-2010-0064132

(51) Int. Cl.
*H01M 4/00* (2006.01)
*H01M 4/13* (2010.01)
*H01M 2/16* (2006.01)
(Continued)

(52) U.S. Cl.
CPC ............. *H01M 4/00* (2013.01); *H01M 2/1673* (2013.01); *H01M 4/13* (2013.01); *H01M 10/0436* (2013.01); *H01M 4/70* (2013.01); *H01M 4/72* (2013.01); *H01M 4/74* (2013.01); *H01M 4/806* (2013.01); *H01M 2004/025* (2013.01); *Y02E 60/122* (2013.01)

(58) Field of Classification Search
CPC ... H01M 2004/025; H01M 4/72; H01M 4/74
See application file for complete search history.

(56) References Cited

U.S. PATENT DOCUMENTS 669,487 A  *  3/1901  Porter .................... H01M 4/72
                                                429/239
2003/0099884 A1 *  5/2003  Chiang ................ G02F 1/1523
                                                429/233
(Continued)

FOREIGN PATENT DOCUMENTS

JP      2004-207231       7/2004
KR   10-2005-0099903     10/2005
(Continued)

OTHER PUBLICATIONS

International Search Report mailed Feb. 22, 2012 for PCT/KR2011/004851.
(Continued)

*Primary Examiner* — Jeremiah Smith

(57) ABSTRACT

The present invention relates to an electrode assembly comprising fiber-shaped structures. The electrode assembly for a battery according to one embodiment of the present invention comprises: a first electrode including a plurality of first fiber-shaped structures extending in a first direction; a second electrode including a plurality of second fiber-shaped structures which extend in a second direction other than the first direction, and the polarities of which are different from the polarities of the first structures; and a first separator film interposed between the first structures and the second structures which intersect with each other, so as to separate the first structures and the second structures from each other.

20 Claims, 6 Drawing Sheets

(51) Int. Cl.
*H01M 10/04* (2006.01)
*H01M 4/74* (2006.01)
*H01M 4/72* (2006.01)
*H01M 4/70* (2006.01)
*H01M 4/80* (2006.01)
*H01M 4/02* (2006.01)

(56) References Cited

U.S. PATENT DOCUMENTS

| | | | | |
|---|---|---|---|---|
| 2009/0263716 A1* | 10/2009 | Ramasubramanian | | H01M 4/0404 429/209 |
| 2009/0311587 A1* | 12/2009 | Best | ......... | H01M 4/74 429/127 |
| 2010/0035105 A1* | 2/2010 | Human | ............ | H01M 4/02 429/421 |
| 2010/0273049 A1* | 10/2010 | Vidal | ............ | H01M 4/0492 429/207 |
| 2011/0065009 A1* | 3/2011 | Lascaud | ............ | H01M 4/0445 429/405 |
| 2011/0070479 A1* | 3/2011 | Matsuda | ............ | H01M 10/0525 429/162 |
| 2011/0136017 A1* | 6/2011 | Singh | ............ | H01M 4/134 429/311 |
| 2012/0077093 A1* | 3/2012 | Matsuda | ............ | H01M 4/0404 429/309 |
| 2012/0276434 A1* | 11/2012 | Gaikwad | ............ | H01M 4/74 429/127 |
| 2012/0308887 A1* | 12/2012 | Hucker | ............ | H01M 2/164 429/211 |

FOREIGN PATENT DOCUMENTS

KR  10-2007-0009231  1/2007
KR  10-2007-0075928  7/2007

OTHER PUBLICATIONS

Written Opinion of the International Search Report mailed Feb. 22, 2012 for PCT/KR2011/004851.

* cited by examiner

[Fig. 11]
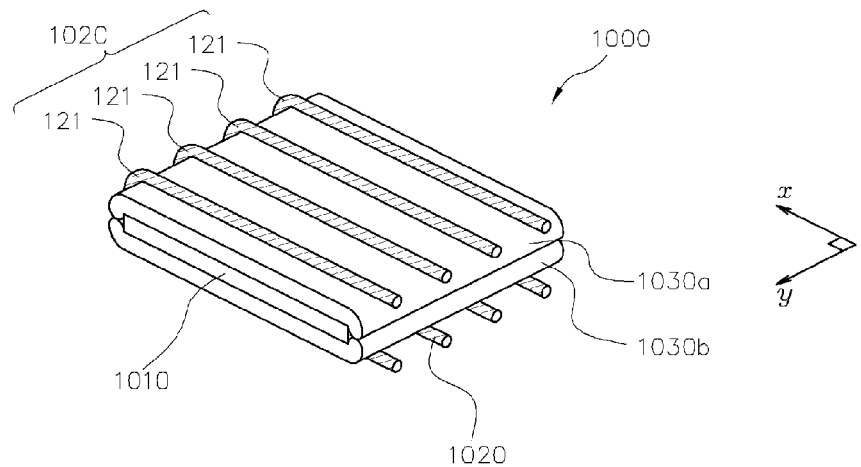
Fig. 12
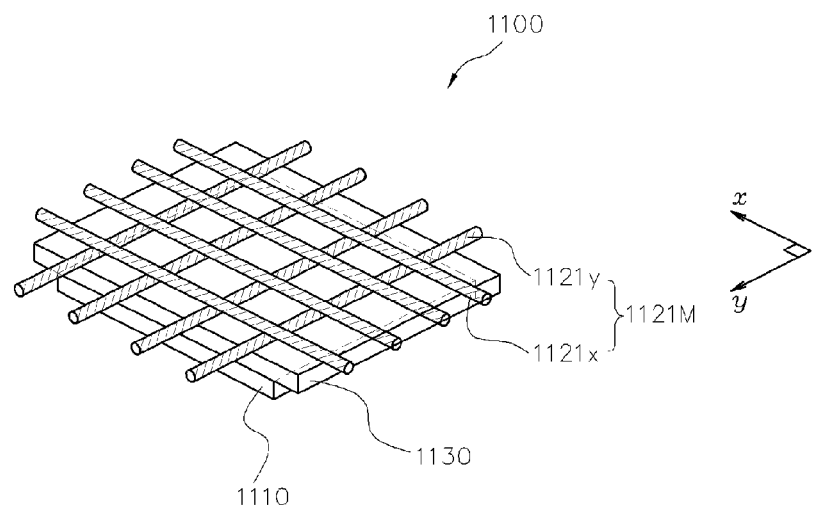
Fig. 13
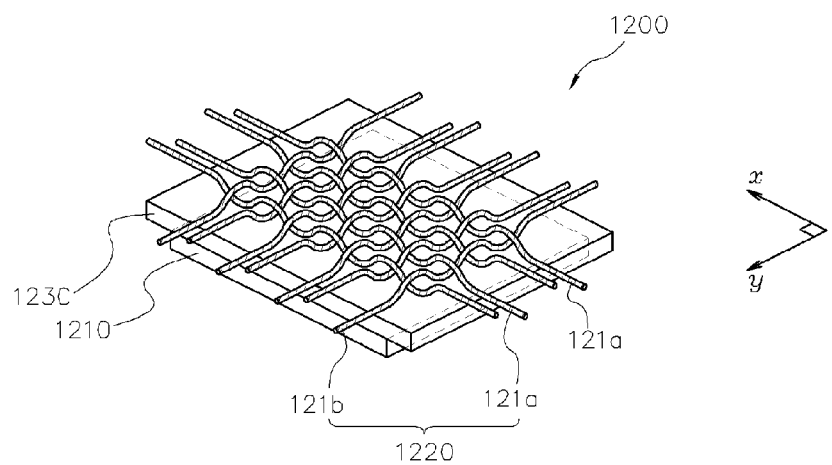

ELECTRODE ASSEMBLY COMPRISING FIBER-SHAPED STRUCTURES

This application claims the priority of Korean Patent Application No. 10-2010-0064132, filed on Jul. 2, 2010 in the KIPO (Korean Intellectual Property Office), the disclosure of which is incorporated herein entirely by reference. Further, this application is the National Stage application of International Application No. PCT/KR2011/004851, filed Jul. 1, 2011, which designates the United States and was published in Korean. Each of these applications is hereby incorporated by reference in their entirety into the present application.

TECHNICAL FIELD

The present invention relates to a battery technology, and more particularly, to an electrode assembly of a battery including fibrous structures.

BACKGROUND ART

As a semiconductor manufacturing technology and a communication technology have recently been developed, the mobile electronic device industry has expanded, and demands for environmental preservation and development of alternative energy due to resource depletion have increased, batteries have been actively studied. Since lithium primary batteries which are representative batteries have a higher voltage and higher energy density than conventional aqueous batteries, the lithium primary batteries may be easily made compact and light. Such lithium primary batteries are widely used, for example, as main power supply sources for mobile electronic devices or backup power supply sources.

Secondary batteries are rechargeable batteries formed of an electrode material having high reversibility. The secondary batteries are classified into cylindrical secondary batteries and polygonal secondary batteries according to outer appearances, and classified into nickel/metal hydride (Ni-MH) secondary batteries, lithium (Li) secondary batteries, and lithium-ion (Li-ion) secondary batteries according to anode and cathode materials. Devices to which secondary batteries are applied have been diversified from small batteries such as mobile phones, notebooks, and mobile displays to medium and large batteries for electric vehicles and hybrid vehicles. Accordingly, batteries are required to have high stability and cost effectiveness as well as lightweight design, high energy density, high charge/discharge speed, high charge/discharge efficiency, and excellent cycle characteristics.

DISCLOSURE OF THE INVENTION

Technical Problem

The present invention provides an electrode assembly of a battery which has high energy density, high charge/discharge efficiency, and excellent cycle characteristics and whose shape and capacity may be easily adjusted.

Technical Solution

According to an aspect of the present invention, there is provided an electrode assembly including: a first electrode including a plurality of first structures that have fibrous shape and extend in a first direction; a second electrode including a plurality of second structures that have fibrous shape and polarity opposite to polarities of the first structures, and extend in a second direction different from the first direction; and a first separator that is disposed between the first structures and the second structures which cross each other, and separates the first structures from the second structures.

The first structures may extend on a first main surface of the first separator to be spaced apart from one another, and the second structures may extend on a second main surface of the first separator which is opposite to the first main surface to be spaced apart from one another. The electrode assembly may further include: a third electrode including a plurality of third structures that have fibrous shape and polarity opposite to the polarity of the first structures, and extend on the first main surface of the first separator in the first direction to alternate with the first structures; and a fourth electrode including a plurality of fourth structures that have fibrous shape and polarity opposite to the polarity of the second structures, and extend on the second main surface of the first separator in the second direction to alternate with the second structures, wherein the third structures and the fourth structures which cross each other are separated from each other by the first separator.

At least some of the first through fourth structures may be partially or totally buried in the first or second main surface of the first separator. The electrode assembly may further include: at least one second separator that is stacked on the first separator to form a multi-layered structure; and a third electrode including a plurality of third structures that extend on a main surface of the second separator which is opposite to an interface between the first separator and the second isolation, and have fibrous shape and polarity opposite to polarity of structures of the interface, wherein the third structures and the structures on the interface cross each other.

The electrode assembly may further include: at least one second separator that is stacked on the first separator to form a multi-layered structure; a fifth electrode including a plurality of fifth structures that extend on a main surface of the second separator which is opposite to an interface between the first separator and the second separator, and have fibrous shape and polarity opposite to polarity of structures on the interface, wherein the fifth structures and the structures on the interface cross each other; and a sixth electrode including a plurality of sixth structures that have fibrous shape and polarity opposite to the polarity of the fifth structures, extend on the other main surface of the second separator to alternate with the fifth structures, wherein the sixth structures and the structures on the interface cross each other. At least some of the first through sixth structures may be partially buried in the first or second separator.

The first structures and the second structures may cross each other as weft threads and warp threads reciprocating through the first separator. Each of the first structures and the second structures may include a current collector core and an active material layer that surrounds the current collector core. Only ones of the first structures and the second structures may selectively further include a solid electrolyte layer that surrounds the active material layer.

A thickness of each of the first and second structures may range from 400 μm to 2,000 μm, and a distance between the first and second structures may range from 2 μm to 400 μm. A distance between the first and second structures may be less than a thickness of each of the first and second structures. The first separator may include any one of a microporous film, a woven fabric, a nonwoven fabric, an intrinsic solid polymer electrolyte film, a gel solid polymer electrolyte film, and a combination thereof. The electrode assembly may be used for a primary battery or a secondary battery.

According to another aspect of the present invention, there is provided an electrode assembly including: a first electrode including a plurality of first structures that have fibrous shape and extend in a first direction, and a plurality of second structures that have fibrous shape and the same polarity as polarity of the first structures and extend in a second direction different from the first direction to cross the first structures; a second electrode including a plurality of third structures that have fibrous shape and extend in a third direction, and a plurality of fourth structures that have fibrous shape and the same polarity as polarities of the third structures and extend in a fourth direction different from the third direction to cross the third structures; and a first separator that separates the first electrode from the second electrode.

The first electrode and the second electrode may be rotated or offset such that the first electrode and the second electrode are not symmetrical with each other. The first and second structures may cross each other as weft threads and warp threads, and the third and fourth structures may cross each other as weft threads and warp threads. Each of the first structures and the second structures may include a current collector core and an active material layer that surrounds the current collector core. Only one of a group of the first and second structures and a group of the third and fourth structures may selectively further include a solid electrolyte layer.

According to another aspect of the present invention, there is provided an electrode assembly including: an isolation matrix; a first electrode including a plurality of first structures that have fibrous shape, and pass through the isolation matrix and extend on a first plane in the isolation matrix in a first direction to be spaced apart from one another; and a second electrode including a plurality of second structures that have fibrous shape, and pass through the isolation matrix and extend on a second plane, which is spaced apart from the first plane to be parallel to the first plane, in the isolation matrix in a second direction different from the first direction to cross the first structures.

The electrode assembly may further include a third electrode including a plurality of third structures that have fibrous shape and polarity opposite to polarity of the first structures, and extend on the first plane in the first direction to alternate with the first structures; and a fourth electrode including a plurality of fourth structures that have fibrous shape and polarity opposite to polarity of the second structures, and extend on the second plane in the second direction to alternate with the second structures. A plurality of the first planes and a plurality of the second planes may be provided to form a multi-layered structure.

Each of the first structures and the second structures may include a current collector core and an active material layer that surrounds the current collector core. Only ones of the first structures and the second structures may selectively further include a solid electrolyte layer that surrounds the active material layer.

The isolation matrix may be any one of a micro-porous film, a woven fabric, a nonwoven fabric, an intrinsic solid polymer electrolyte film, a gel solid polymer electrolyte film, and a combination thereof. A thickness of each of the first and second structures may range from 400 µm to 2,000 µm, and a distance between the first and second structures may range from 2 µm to 400 µm. A distance between the first and second structures may be less than a thickness of each of the first and second structures.

According to another aspect of the present invention, there is provided an electrode assembly including: an isolation matrix; a first electrode including a plurality of first structures that have fibrous shape, and pass through the isolation matrix and extend on a first plane in the isolation matrix in a first direction to be spaced apart from one another; and a second electrode including a plurality of second structures that have fibrous shape, and pass through the isolation matrix and extend on the first plane in a second direction different from the first direction such that the second structures and the first structures cross each other as weft threads and warp threads.

The electrode assembly may further include a second cathode and a second anode respectively including a plurality of third structures and a plurality of fourth structures which have fibrous shapes and extend on a second plane, which is spaced apart from the first plane to be parallel to the first plane, in the isolation matrix such that the third and fourth structures and the first and second structures cross each other as weft threads and warp threads. Each of the first structures and the second structures may include a current collector core and an active material that surrounds the current collector core. Only ones of the first structures and the second structures may selectively further include a solid electrolyte layer that surrounds the active material layer.

The isolation matrix may include an intrinsic solid polymer electrolyte film or a gel solid polymer electrolyte film. A thickness of each of the first and second structures may range from 400 µm to 2,000 µm, and a distance between the first and second structures may range from 2 µm to 400 µm. A distance between the first and second structures may be less than a thickness of the first and second structures.

According to another aspect of the present invention, there is provided an electrode assembly including: a first electrode including a plurality of first structures that have fibrous shapes and extend in a first direction; a second electrode that has a planar shape and a polarity opposite to polarities of the first structures; and a separator that is disposed between the first electrode and the second electrode.

The electrode assembly may further include a third electrode including a plurality of second structures that have fibrous shape and the same polarity as the polarity of the first structures, and extend in a second direction different from the first direction to cross the first structures. The first structures and the second structures may cross each other as weft threads and warp threads. The first and second structures may reciprocate through the separator.

The first structures may further extend to surround both main surfaces of the second electrode. A thickness of each of the first structures may range from 400 µm to 2,000 µm, and a distance between the first structures may range from 2 µm to 400 µm. A distance between the first structures may be less than a thickness of each of the first structures.

The present also provides a battery having the electrode assembly. The battery having the electrode assembly may be a primary battery or a secondary battery.

Advantageous Effects

According to the one or more embodiments of the present invention, since at least some electrodes include a plurality of structures having fibrous shapes, an interfacial surface area between the electrodes may be increased due to curved surfaces and 3D arrangements of the structures. Accordingly, battery energy density in the same volume may be improved, and charge/discharge speed, charge/discharge efficiency, and battery cycle characteristics may also be improved.

Also, since fibrous structures constitute electrodes, a shape of a battery may be easily changed. Since capacity may be easily adjusted by bending or stacking the battery, the battery may be easily used as a small battery or a large or medium battery.

BRIEF DESCRIPTION OF THE DRAWINGS

FIG. 11 is a perspective view illustrating an electrode assembly according to another embodiment of the present invention;

FIG. 12 is a perspective view illustrating an electrode assembly according to another embodiment of the present invention; and FIG. 13 is a perspective view illustrating an electrode assembly according to another embodiment of the present invention.

MODE FOR CARRYING OUT THE INVENTION

Figure 1:
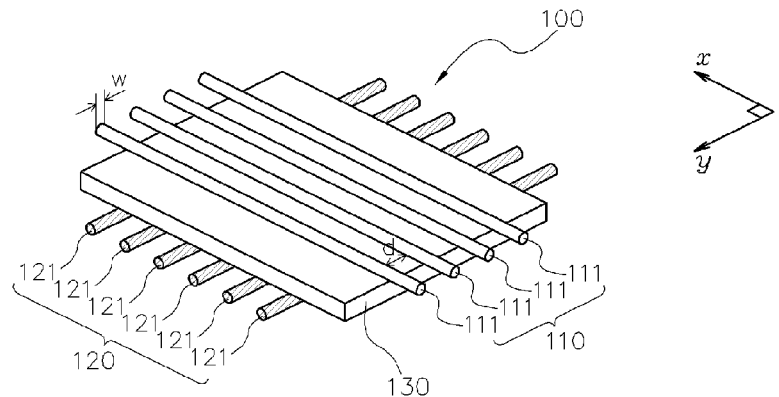
FIG. 1 is a perspective view illustrating an electrode assembly of a battery, according to an embodiment of the present invention.

The present invention will now be described more fully with reference to the accompanying drawings, in which exemplary embodiments of the invention are shown.

The present invention now will be described more fully hereinafter with reference to the accompanying drawings, in which elements of the invention are shown. The present invention may, however, be embodied in many different forms and should not be construed as limited to the exemplary embodiments set forth herein. Rather, these embodiments are provided so that this disclosure will be thorough and complete, and will fully convey the scope of the present invention to one of ordinary skill in the art.

Also, in the drawings, thicknesses or sizes of layers are exaggerated for convenience of explanation and clarity, and the same reference numerals denote the same elements. As used herein, the term "and/or" includes any and all combinations of one or more of the associated listed items.

The terminology used herein is for the purpose of describing particular embodiments only and is not intended to be limiting of exemplary embodiments of the present invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It will be understood that, although the terms first, second, third etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of exemplary embodiments.

The embodiments of the present invention provide an electrode assembly including an electrode including a plurality of fibrous structures which may increase an interfacial surface area between electrodes as compared to a conventional two-dimensional (2D) battery structure in which a plate-type anode and a plate-type cathode face each other.

When the expression 'different direction' is used herein, it means that when an anode including a plurality of fibrous structures and a cathode including a plurality of fibrous structures are stacked or wound to form an electrode structure, the fibrous structures of any one electrode extend in an arbitrary direction other than a direction in which the fibrous structures of the other electrode extend. That is, the plurality of fibrous structures constituting the anode and the cathode may have structural flexibility high enough to be arranged at various angles and in various directions.

Also, when the expression 'cross each other' is used herein, it means that when an anode including a plurality of fibrous structures and a cathode including a plurality of fibrous structures are stacked or wound to form an electrode structure, the fibrous structures of the anode and the cathode are arranged to have at least one point where they meet each other, which is different from a conventional structure in which an anode and a cathode are stacked or arranged in the same direction.

Also, when the term 'separator' is used herein, the separator includes a separator that is generally commonly used in a liquid electrolyte battery using a liquid electrolyte having affinity with the separator. Furthermore, when the separator used herein includes an intrinsic solid polymer electrolyte and/or a gel solid polymer electrolyte which is so strongly bound to the separator that the electrolyte and the separator are recognized as the same. Accordingly, the meaning of the separator has to be defined as described herein.

Figure 2:
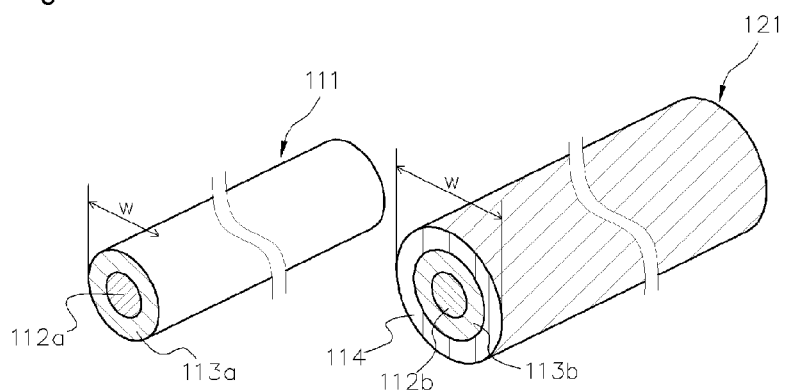
FIG. 2 is a perspective cross-sectional view illustrating fibrous structures, according to other embodiment of the present invention.

FIG. 1 is a perspective view illustrating an electrode assembly 100 of a battery, according to an embodiment of the present invention. FIG. 2 is a perspective cross-sectional view illustrating first and second structures 111 and 121 having fibrous shapes, according to an embodiment of the present invention.

Referring to FIG. 1, the electrode assembly 100 constituting the battery includes a plurality of the first and second structures 111 and 121 and a separator 130. The first structures 111 may extend in parallel, and the second structures 121 may extend in parallel. The first structures 111 may extend in an x direction, and the second structures 121 may extend in a y direction different from the x direction.

The first structures 111 and/or the second structures 121 may extend in parallel to be spaced apart from one another by a distance 'd' as shown in FIG. 1. Each of the first structures 111 and/or the second structures 121 may have a thickness w enough to provide forming processability suitable for various arrangements of the first and second structures 111 and 121. For example, the thickness w of the first and second structures 111 and 121 may range from 400 μm to 2,000 μm, and may be appropriately determined according to a field to which the battery is applied. The distance d may be greater than 0 μm and less than 1,000 μm, and preferably, from 2 μm to 400 μm. As described below, in order to increase an interfacial surface area between electrodes, the distance d may be greater than 0 μm and less than the thickness w of the first and second structures 111 and 121.

The first structures 111 extending in one direction in parallel may be electrically connected to one another to constitute one electrode, for example, a cathode 110. Likewise, the second structures 121 may be electrically connected to one another to constitute another electrode having a different polarity, for example, an anode 120.

Although the first structures 111 and the second structures 121 extend perpendicular to each other in FIG. 1, the present embodiment is not limited thereto. For example, the first and second structures 111 and 121 having fibrous shapes may extend with an angle of about 45° or 60° therebetween.

Referring to FIG. 2, the first and second structures 111 and 121 may include anode and cathode current collector cores 112a and 112b and anode and cathode active material layers 113a and 113b that surround the anode and cathode current collector cores 112a and 112b. The anode and cathode active material layers 113a and 113b may be respectively coated on the anode and cathode current collector cores 112a and 112b with slurries including a corresponding active material, a binder, and a conductive material. Each of the slurries may include the corresponding active material in an amount of 80 to 98 wt %, the binder in an amount of 1 to 10 wt %, and the conductive material in an amount of 1 to 10 wt % based on 100 wt %.

A thickness of the anode active material layer 113a may range from 1 μm to 300 μm, and preferably, from 30 μm to 100 μm. A thickness of the cathode active material layer 113b may range from 3 μm to 100 μm, and preferably, from 3 μm to 40 μm, and more preferably, from 5 μm to 20 μm. Since a thickness of the cathode active material layer 113b is determined in the aforesaid range, the battery may ensure high output and may be made very thin. When a thickness of the cathode active material layer 113b is less than 3 μm, the effect of retarding internal short-circuit may be degraded, and when the battery is a lithium-ion secondary battery, high output may not be ensured. Also, when a thickness of the cathode active material layer 113b is greater than 100 μm, the battery may not be made thin.

The anode and cathode current collector cores 112a and 112b may be, for example, soft metal lines. For example, the cathode current collector core 112a may be formed of a metal-based material such as stainless steel, titan, aluminum, or an alloy thereof. Preferably, the cathode current collector core 112a may be formed of aluminum or an alloy thereof. The anode current collector core 112b may be formed of a metal-based material such as copper, stainless steel, nickel, or an alloy thereof. Preferably, the anode current collector core 112b may be formed of copper or an alloy thereof.

However, the present embodiment is not limited thereto, and each of the cathode and anode current collector cores 112a and 112b may include a material whose shape may be easily changed, for example, a polymer material having electronic conductivity such as poly(sulfurnitrile), polypyrrole, poly(p-phenylene), poly(phenylene sulfide), polyaniline, or Poly(p-phenylenevinylene). Alternatively, each of the cathode and anode current collector cores 112a and 112b may be formed of a fibrous material obtained by mixing a conductive carbon paste, a nano metal particle paste, or an indium tin oxide (ITO) paste with a binder.

Although the cathode and anode current collector cores 112a and 112b of FIG. 2 have circular cross-sectional shapes in FIG. 2, the present embodiment is not limited thereto. For example, the cathode and anode current collector cores 112a and 112b may have arbitrary shapes that may allow the cathode and anode active material layers 113a and 113b to be easily attached to the anode and cathode current collector cores 112a and 112b. For example, the cathode and anode current collector cores 112a and 112b may have predetermined surface roughnesses and arbitrary cross-sectional shapes, for example, square or oval cross-sectional shapes, whose surface curvature change ranges from 60% to 140%.

The active material layer 130 may include a material layer suitable for a primary battery or a secondary battery. For example, when the battery is a primary battery, the cathode active material layer 113a may include manganese oxide, electrolytic manganese dioxide (EMD), nickel oxide, lead oxide, lead dioxide, silver oxide, iron sulfate, or conductive polymer particles, and the anode active material layer 113b may include zinc, aluminum, iron, lead, or magnesium particles.

When the battery is a secondary battery, the cathode active material layer 113a may include a Li compound including at least one metal of Ni, Co, Mn, Al, Cr, Fe, Mg, Sr, V, La, and Ce, and at least one nonmetal element selected from the group consisting of O, F, S, P and a combination thereof. For example, the cathode active material layer 113a may include a compound represented by $LiaAl-bBbD2$, where A is selected from the group consisting of Ni, Co, Mn, and a combination thereof, B is selected from the group consisting of Al, Ni, Co, Mn, Cr, Fe, Mg, Sr, V, a rare earth element, and a combination thereof, and D is selected from the group consisting of O, F, S, P, and a combination thereof, and $0.95 \leq a \leq 1.1$ and $0 \leq b \leq 0.5$.

When the battery is a secondary battery, the anode active material layer 113b may include a carbon-based material such as a low-crystallized carbon or high-crystallized carbon-based material which can intercalate and deintercalate lithium ions. The low-crystallized carbon may be soft carbon or hard carbon. The high-crystallized carbon may be natural graphite or high temperature baked carbon such as Kish graphite, pyrolytic carbon, mesophase pitch-based carbon fiber, meso-carbon microbeads, Mesophase pitches, or petroleum or coal tar pitch-derived cokes. The anode active material layer 113b may include a binder, and the binder may be a polymer material such as vinylidene fluoride-hexfluoropropylene copolymer (PVDF-co-HFP), polyvinylidenefluoride, polyacrylonitrile, or polymethylmethacrylate. Alternatively, in order to provide a high-capacity secondary battery, the cathode active material layer 113b may include a metal-based or intermetallic compound including S, Si, or Sn.

Although the current collector cores 112a and 112b and the active material layers 113a and 113b are separately formed in FIG. 2, the present embodiment is not limited thereto: any current collector core and a corresponding active material layer of at least one of the first structures 111 and the second structures 121 may be formed of the same material.

In one example, only one of the first and second structures 111 and 121 may further include a solid electrolyte layer such as an intrinsic solid polymer electrolyte layer. The solid electrolyte layer may be formed by using a consecutive impregnation process using the same solvent as that used to form an active material layer disposed under the solid electrolyte layer. The solid electrolyte layer may include, for example, a polymer matrix composed of any one of polyethylene, polypropylene, polyimide, polysulfone, polyurethane, polyvinyl chloride, polystyrene, polyethylene oxide, polypropylene oxide, polybutadiene, cellulose, carboxymethyl cellulose, nylon, polyacrylonitrile, polyvinylidene fluoride, polytetrafluoroethylene, a copolymer of vinylidene fluoride and hexafluoropropylene, a copolymer of vinylidene fluoride and trifluoroethylene, a copolymer of vinylidene fluoride and tetrafluoroethylene, polymethylacrylate, polyethylacrylate, polymethylmethacrylate, polyethylmethacrylate, polybutylacrylate, polybutylmethacrylate, polyvinyl acetate, polyvinyl alcohol, and a combination thereof, an additive, and an electrolytic solution. The additive may be silica, talc, alumina (Al2O3), TiO2, clay, zeolite, or a combination thereof. The electrolytic solution may be an aqueous electrolytic solution including salt such as potassium hydroxide (KOH), potassium bromide (KBr), potassium chloride (KCL), zinc chloride (ZnCl2), or sulfuric acid (H2SO4).

In FIG. 2, only the second structures 121 further each include a solid electrolyte layer 114 such as an intrinsic solid polymer electrolyte. As such, since the solid electrolyte layer 114 is formed on structures of any of the cathode 110 and the anode 120, a volume may be reduced when compared to a case where the solid electrolyte layer 114 is formed on structures of both the cathode 110 and the anode 120, thereby further improving energy density. Also, assuming that the first structures 111 of the cathode 110 and the second structures 121 of the anode 120 cross each other, if the solid electrolyte layer 114 is formed on both the cathode 110 and the anode 120, cracks may occur in the solid electrolyte layer 114 due to a change in a volume of the electrode assembly 100 while a secondary battery is charged or discharged, thereby reducing the lifetime of the electrode assembly 100. Accordingly, preferably, the solid electrolyte layer 114 may be selectively formed only on the structures of one electrode whose volume change is smaller during its charging/discharging than other electrode. For example, when the battery is a secondary battery, the solid electrolyte layer 114 may be selectively formed only on the second structures 121 of the anode 120 whose volume change is relatively small during charging/discharging as shown in FIG. 2.

Referring back to FIG. 1, the separator 130 may have a layered shape, and is disposed between the first structures 111 constituting the cathode 110 and the second structures 121 constituting the anode 120. The separator 130 may be, for example, a micro-porous film, a woven fabric, a non-woven fabric, an intrinsic solid polymer electrolyte film, or a gel solid polymer electrolyte film. The intrinsic solid polymer electrolyte film may include a straight chain polymer material or a cross-linked polymer material. The gel polymer electrolyte film may be any one of a plasticizer-containing polymer including salt, a filler-containing polymer, and a pure polymer, or a combination thereof.

The above-listed materials for the separator 130 are exemplary, and any appropriate electronic insulating material whose shape may be easily changed and have appropriate ionic conductivity, and which has high mechanical strength and may not be broken or cracked even when the electrode assembly 100 is deformed may be used for the separator 130. The separator 130 may be a single-layered film or a multi-layered film. The multi-layered film may be a stack of single-layered films formed of the same material or a stack of films formed of different materials. A thickness of the separator 130 may range from 10 μm to 300 μm, preferably, from 10 μm to 40 μm, and more preferably, from 10 μm to 25 μm in consideration of durability, shut-down function, and battery stability.

As described above, the first structures 111 constituting the cathode 110 and the second structures 121 constituting the anode 120 extend in different directions, and cross each other in different directions with the separator 130 therebetween. Since the first and second structures 111 and 121 of the cathode 110 and the anode 120 have curved surfaces and are arranged in a three-dimensional (3D) manner and cross each other with the separator 130 therebetween, an interfacial surface area between the cathode 110 and the anode 120 may be increased. As a result, energy density in the same volume may be improved, and charge/discharge speed, charge/discharge efficiency, and battery cycle characteristics may also be improved.

Figure 3:
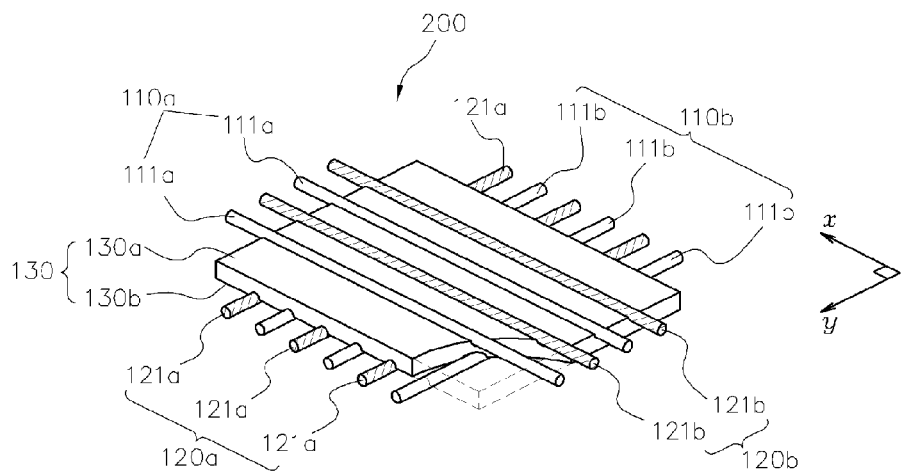
FIG. 3 is a perspective view illustrating an electrode assembly of a battery, according to another embodiment of the present invention.

FIG. 3 is a perspective view illustrating an electrode assembly 200 of a battery, according to another embodiment of the present invention.

Referring to FIG. 3, the electrode assembly 200 includes a plurality of first through fourth structures 111a, 121a, 121b, and 111b having fibrous shapes, and the separator 130. The first structures 111a and the second structures 121a which extend in parallel in one direction correspond to the first and second structures 111 and 121 of the electrode assembly 100 illustrated in FIG. 1. The first and second structures 111a and 121a are coupled to each other and may respectively constitute a first cathode 110a and a first anode 120a of the battery.

The electrode assembly 200 of FIG. 3 further includes the third structures 121b that have fibrous shapes and extend on a first main surface 130a of the separator 130 in the same direction as the first structures 111a to alternate with the first structures 111a. Likewise, the electrode assembly 200 may further include the fourth structures 111b that have fibrous shapes and extend on a second main surface 130b of the separator 130 in the same direction as the second structures 121a of the anode 120a to alternate with the second structures 121a.

The third structures 121b and the fourth structures 111b may have respectively polarity opposite to that of the first structures 111a and the second structures 121a which are respectively adjacent to the third structures 121b and the fourth structures 111b. For example, the third structures 121b may constitute a second anode 120b and the fourth structures 111b may constitute a second cathode 110b.

The first cathode 110a and the second cathode 110b may be coupled to each other with leads to constitute one single common cathode. Likewise, the first anode 120a and the second anode 120b may be electrically coupled to each other to constitute one single common anode. However, it is exemplary and the present embodiment is not limited thereto. For example, any one of the first cathode 110a and the second cathode 110b and any one of the first anode 120a and the second anode 120b may be coupled to each other, and the remaining cathode and anode may be provided as external electrodes to provide a bipolar battery. Also, it would be understood by one of ordinary skill in the art that any of various bipolar batteries for increasing an operating voltage may be provided by appropriately selecting the number and arrangement of structures having opposite polarities, coupling the structures in series in the battery, and providing remaining structures as a cathode and an anode.

In order to ensure stable insulation between adjacent structures having opposite polarities, some of the first through fourth structures 111a, 121a, 121b, and 111b may be partially buried in the first and second main surfaces 130a and 130b of the separator 130 as shown in FIG. 3. To this end, trenches T (see FIG. 5) for receiving the first through fourth structures 111a, 121a, 121b, and 111b may be formed in the first and second main surfaces 130a and 130b of the separator 130, or the first through fourth structures 111a, 121a, 121b, and 111b may be buried in the first and second main surfaces 130a and 130b of the separator 130 by pressing the first through fourth structures 111a, 121a, 121b, and 111b after the first through fourth structures 111a, 121a, 121b, and 111b are disposed.

As described with reference to FIG. 2, a solid electrolyte layer may be further formed only on an active material layer of structures having one type of polarity. In this case, adjacent structures having opposite polarities may extend on the same surface of the separator 130 while contacting each other without being spaced apart from each other. For example, in FIG. 3, a solid electrolyte layer may be selectively formed only on one of the first structures 111a and the third structures 121b, and the first structures 111a and the third structures 121b may be arranged in parallel on the first main surface 130a of the separator 130 without being spaced apart from each other. Likewise, a solid electrolyte layer may be selectively formed only on one of the second structures 121a and the fourth structures 111b, and in this case, the second structures 121a and the fourth structures 111b may be arranged in parallel on the second main surface 130b of the separator 130 without being spaced apart from each other.

In FIG. 3, since the first through fourth structures 111a, 121a, 121b, and 111b having 3D curved surfaces are disposed such that structures having opposite polarities face each other by crossing each other with the separator 130 therebetween and also face each other on the same main surface of the separator 130, an interfacial surface area between electrodes may be increased as compared to that of a simple conventional planer electrode assembly. Accordingly, energy density in the same volume may be improved, and charge/discharge speed, charge/discharge efficiency, and battery cycle characteristics may also be improved.

Figure 4:
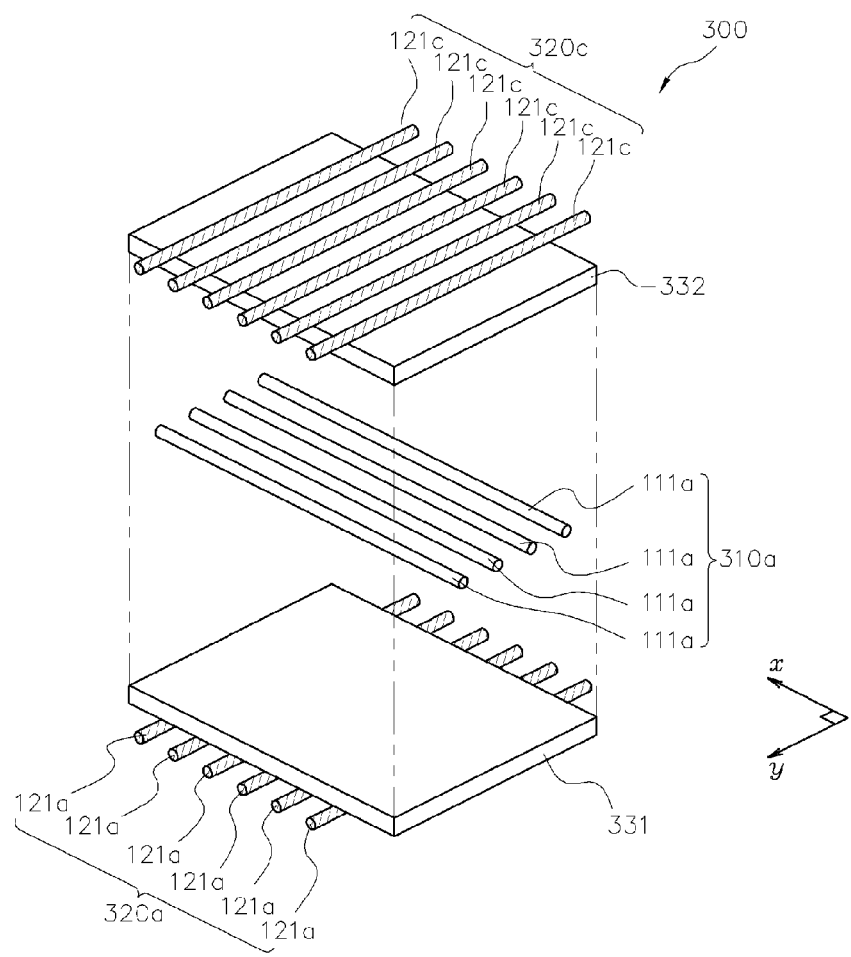
FIG. 4 is an exploded perspective view illustrating an electrode assembly of a battery, according to another embodiment of the present invention.

FIG. 4 is an exploded perspective view illustrating an electrode assembly 300 of a battery, according to another embodiment of the present invention.

Referring to FIG. 4, the electrode assembly 300 includes first and second separators 331a and 332b which are stacked. Although the first separator 331a and the second separator 332b are illustrated in FIG. 4, the present embodiment is not limited thereto and three or more separators may be stacked.

In the electrode assembly 300, the first structures 111a constituting a first electrode 310a, the second structures 121a constituting a second electrode 320a, and the first separator 331 are the same as those described with reference to FIG. 1. Third structures 121c on a main surface of the second separator 332 which is opposite to an interface between the first separator 331 and the second separator 332, extend in a direction, for example, a y direction, to cross the first structures 111a extending in, for example, an x direction.

Also, the third structures 121c may have polarity opposite to that of the first structures 111a. For example, when the first electrode 310a is a cathode, the third structures 121c may be coupled to one another to constitute a second anode 320c. The second electrode 320a (referred to as a first anode) and the second anode 320c may be coupled to each other to constitute one common anode. Although not shown in FIG. 4, another separator may be stacked over the second separator 332, and the first electrode 310a (referred to as a first cathode) may be coupled to structures of a cathode on the another isolation form stacked on the second separator 332 to constitute one common cathode. The structure is exemplary, and a bipolar battery may be provided by appropriately determining the number and arrangement of structures having opposite polarities and coupling the structures.

Figure 5:
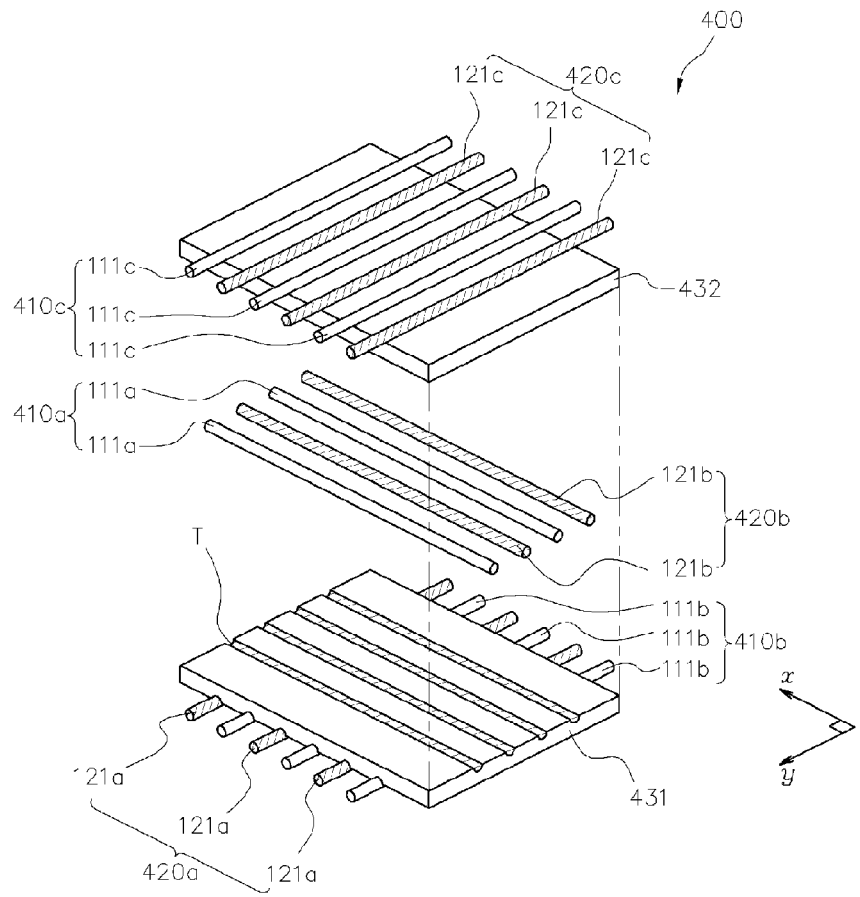
FIG. 5 is an exploded perspective view illustrating an electrode assembly of a battery, according to another embodiment of the present invention.

FIG. 5 is an exploded perspective view illustrating an electrode assembly 400 of a battery, according to another embodiment of the present invention.

Referring to FIG. 5, the electrode assembly 400 includes a plurality of separators, that is, first and second separators 431 and 432 which are stacked. Although the first separator 431 and the second separator 432 are illustrated in FIG. 5, three or more separators may be stacked.

In the electrode assembly 400, for the first through fourth structures 111a, 121a, 121b, and 111b respectively constituting electrodes 410a, 420a, 420b, and 410b, the disclosure with reference to FIG. 3 may be referred to. Additional Fifth and sixth structures 111c and 121c, which extend on a main surface of the second separator 432 which is opposite to interface between the first separator 431 and the second separator 432, extend in a direction, for example, a y direction, to cross the first structures 111a and the third structures 121b disposed under the fifth and sixth structures 111c and 121c. The fifth and sixth structures 111c and 121c have opposite polarities, and may be disposed on the main surface of the second separator 432 to alternate with each other.

As described above with reference to FIG. 3, a solid electrolyte layer may be further formed only on an active material layer of each of structures having one polarity. In this case, adjacent structures having opposite polarity may extend on the same main surface of the first and second separators 431 and 432 by contacting each other without being spaced apart from each other.

Also, a cathode 410c and an anode 420c may be provided by appropriately combining groups of structures having different stack orders and extension directions, or a bipolar battery may be provided by selecting some of structures and electrically coupling the structures as described above. As in FIGS. 4 and 5, since two or more separators are stacked and fibrous structures are arranged on interface and a main surface of the separators opposite to the interface, an interfacial electrode area between adjacent structures having opposite polarities is increased, thereby improving energy density, charge/discharge speed, charge/discharge efficiency, and battery cycle characteristics.

Figure 6A:
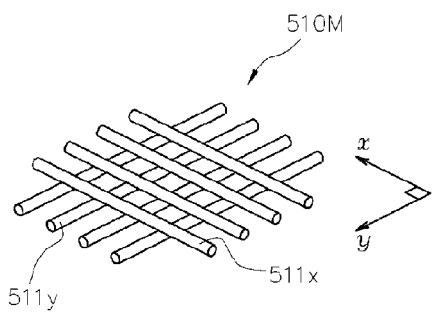
FIGS. 6A through 6C are perspective views illustrating an electrode assembly according to another embodiment of the present invention.
Figure 6B:
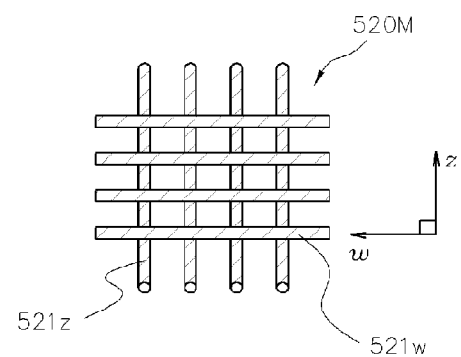
Figure 6C:
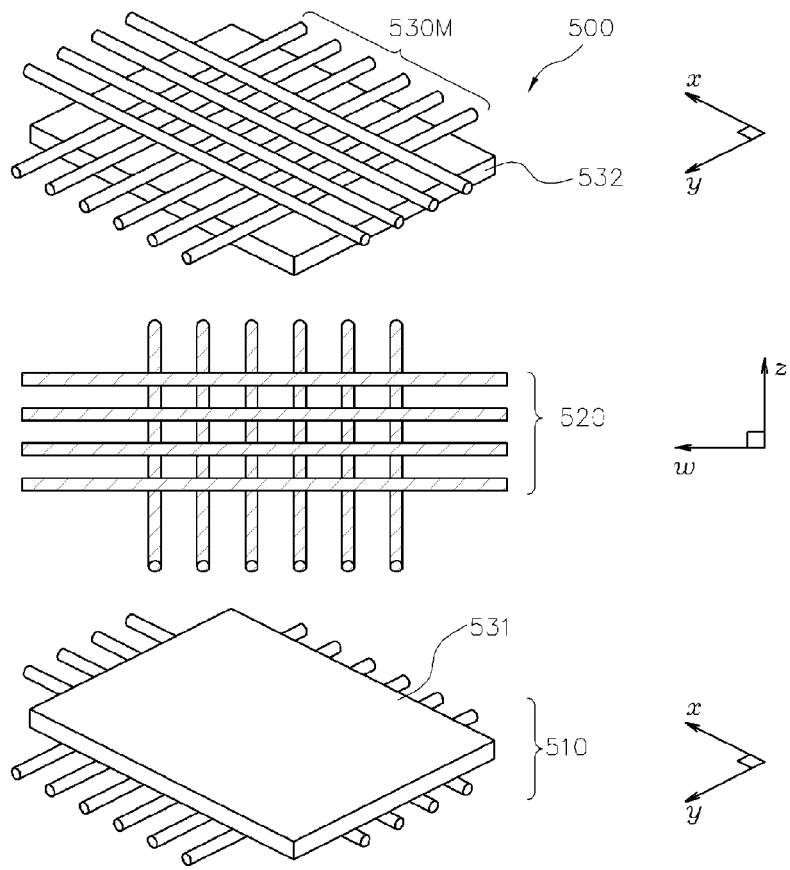

FIGS. 6A through 6C are perspective views illustrating an electrode assembly 500 according to another embodiment of the present invention.

Referring to FIGS. 6A and 6B, each of a cathode 510M and an anode 520M of the electrode assembly 500 includes a plurality of fibrous structures which have the same polarity and cross each other. The plurality of fibrous structures 511x and 511y and 521w and 521z having the same polarity may contact each other and may form grid structures, respectively. For example, the cathode 510M includes the plurality of fibrous structures 511x that extend in an x direction, and the plurality of fibrous structures 511y that extend in another direction, that is, a y direction, to cross the structures 511x. The anode 520M includes the plurality of fibrous structures 521w and 521z which extend in different directions, that is, a w direction and a z direction, and cross each other.

In the electrode assembly 500 of FIG. 6C, a first separator 531 is disposed between the cathode 510M and the anode 520M, to electrically isolate the cathode 510M and the anode 520M. The cathode 510M and the anode 520M may be aligned to be symmetrical with each other about the first separator 531. Alternatively, as shown in FIG. 6C, the grid structures of the electrode 510M and 520M may be rotated such that the cathode 510M and the anode 520M cross each other without being symmetrical with each other. That is, the cathode 510M may be disposed such that the structures 511x and 511y are aligned in the w and z directions, and the anode 520M may be disposed such that the structures 521w and 521z are aligned in the x and y directions. In this case, an interfacial area between structures may be increased when compared to a case where the cathode 510M and the anode 520M are accurately aligned with each other.

In other example, the cathode 510M and the anode 520M may be aligned in the same direction and their grid structures may be misaligned. For example, although not shown in FIGS. 6A through 6C, the cathode 510M and the anode 520M may be offset such that both the structures 511x and 511y of the cathode 510M and the structures 521w and 521z of the anode 520M may be arranged in the x and y directions, and any one of the cathode 510M and the anode 520M may be moved in the x direction or the y direction to misalign the grid structures. Also, an interfacial area may be increased by combining the aforesaid rotation method and the movement method to misalign the grid structures of the cathode 510M and the anode 520M.

In another example, as shown in FIG. 6C, a second separator 532 may be stacked over the first separator 531, and an electrode 530M having another grid structure may be disposed on a main surface of the second separator 532 which is opposite to interface between the first separator 531 and the second separator 532. Accordingly, energy density may be further improved. The additional electrode 530M may be an anode, and the electrode 530M and the cathode 510M disposed under the electrode 530M may be aligned in such a manner as that described for the alignment of the cathode 510M and the anode 520M.

Figure 7:
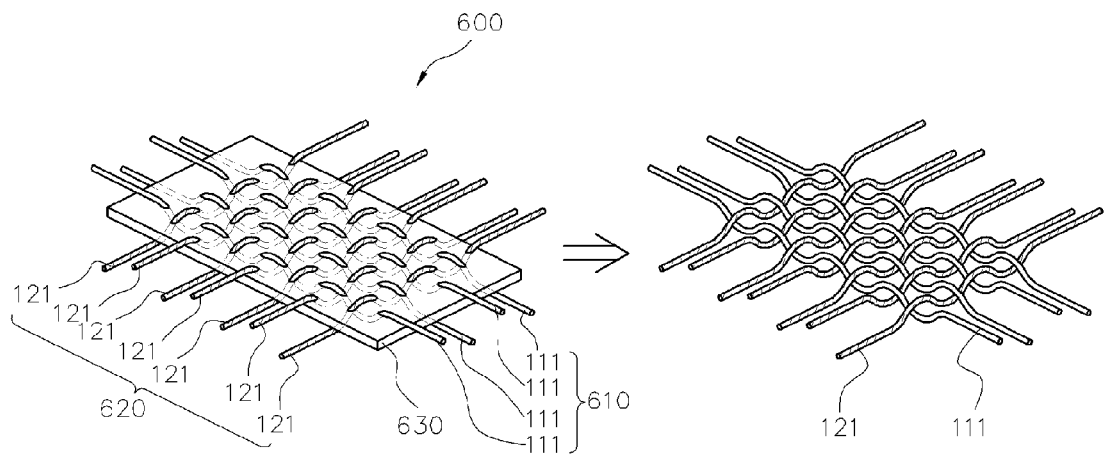
FIG. 7 is a perspective view illustrating an electrode assembly of a battery, according to another embodiment of the present invention.

FIG. 7 is a perspective view illustrating an electrode assembly 600 of a battery, according to another embodiment of the present invention.

Referring to FIG. 7, in the electrode assembly 600, the first structures 111 constituting a first electrode 610 and the second structures 121 constituting a second electrode 620 cross each other as weft threads and warp threads reciprocating through a separator 630. The right image illustrates the electrode assembly 600 from which the separator 630 is not shown in order to clearly show the first structures 111 and the second structures 121.

Since different structures are insulated by the separator 630, even when the electrode assembly 600 is deformed, the first and second structures 111 and 121 may be prevented from being short-circuited. Energy density may be improved and insulation between the first and second structures 111 and 121 may be improved by forming a solid electrolyte layer only on structures having one polarity as described with reference to FIG. 2. Although not shown in FIG. 7, one or more separators may be further stacked over the separator 630 without departing from the scope of the present invention.

Also, as described above, when the first and second structures 111 and 121 having fibrous structures cross each other in different directions, the first and second structures 111 and 121 may cross each other at a predetermined frequency, or at least some of the first and second structures 111 and 121 may cross each other at random. Since structures having one polarity are at least partially buried in structures having opposite polarity, an interfacial area between the first electrode 610 and the second electrode 620 may be increased, energy density may be improved, and charge/discharge speed, charge/discharge efficiency, and lifetime may also be improved.

Figure 8:
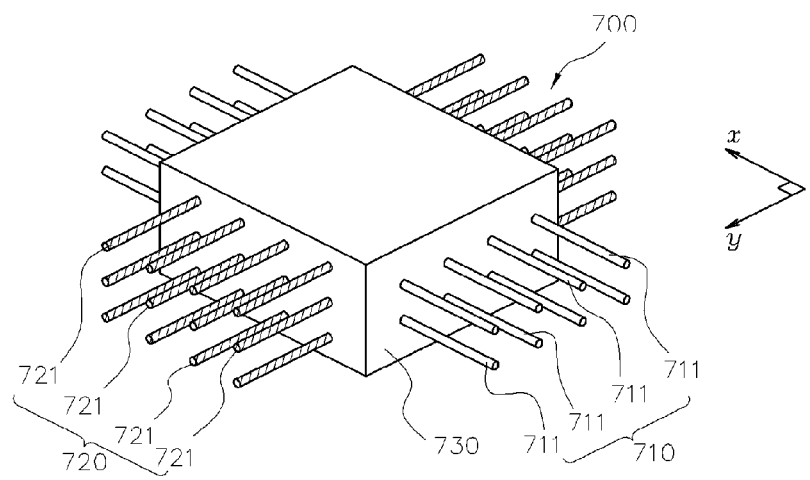
FIG. 8 is a perspective view illustrating an electrode assembly according to another embodiment of the present invention.

FIG. 8 is a perspective view illustrating an electrode assembly 700 according to another embodiment of the present invention.

Referring to FIG. 8, the electrode assembly 700 includes, instead of a separator, an isolation matrix 730 that has a thickness great enough for at least two electrodes 710 and 720 respectively including first and second structures 711 and 712 having opposite polarities to be embedded in the isolation matrix 730. The isolation matrix 730 may be formed of the same material as those of the separators in the previous embodiments. In order to align the first and second structures 711 and 712 in the isolation matrix 730, the isolation matrix 730 may be provided by aligning the first and second structures 711 and 722 in a solution that is to be an isolation matrix and then coagulating the solution. The isolation matrix 730 may be formed of an intrinsic solid polymer electrolyte or a gel polymer electrolyte.

The first structures 711 passing through the isolation matrix 730 and extending in an x direction may be disposed on the same plane. Likewise, the second structures 721 passing through the isolation matrix 730 and extending in a y direction may be disposed on the same plane. The planes on which the first and second structures 711 and 712 having opposite polarities are disposed are spaced apart from each other, and the first and second structures 711 and 721 are separated from each other in the isolation matrix 730.

It would be understood by one of ordinary skill in the art that the first and second structures 711 and 721 passing through the isolation matrix 730 may be stacked as two or more layers in the isolation matrix 730, and two or more isolation matrixes 730 may be stacked. Since an interfacial area between the first and second structures 711 and 722 which are adjacent to each other is increased in a 3D manner, energy density may be improved, and charge/discharge efficiency and battery cycle characteristics may also be improved.

Although structures having opposite polarities are spaced apart in FIG. 8, a solid electrolyte layer such as an intrinsic solid polymer electrolyte layer may be further formed only on the structures having a specific one of two polarities, for example, the structures of an anode. In this case, structures having opposite polarities may extend to cross in the same direction or different directions without being spaced apart from each other. Alternatively, structures having the same polarities may extend to cross in the same direction or different directions by contacting each other without being spaced apart from each other.

Figure 9:
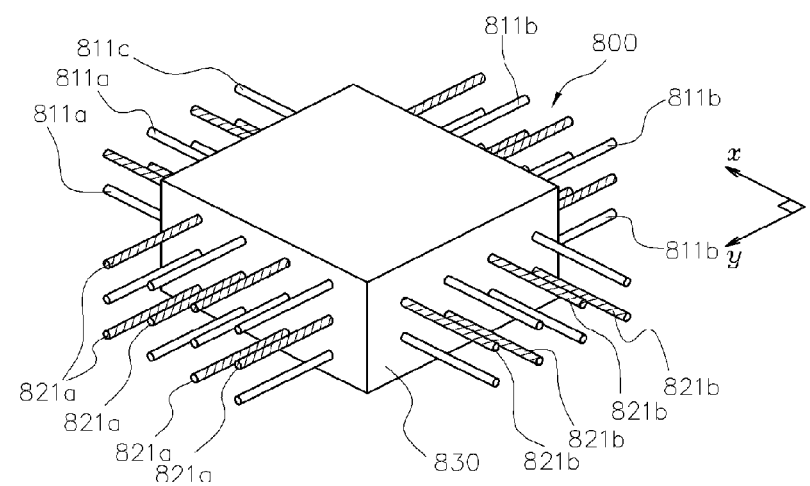
FIG. 9 is a perspective view illustrating an electrode assembly according to another embodiment of the present invention.

FIG. 9 is a perspective view illustrating an electrode assembly 800 according to another embodiment of the present invention.

Referring to FIG. 9, the electrode assembly 800 includes an isolation matrix 830 that has a thickness great enough for first through fourth structures 881a, 821a, 821b, and 811b having different polarities to be stacked to cross each other in the isolation matrix 830. In order to align the first through fourth structures 811a, 821a, 821b, and 811b in the isolation matrix 830, the isolation matrix 830 may be provided by aligning the first through fourth structures 811a, 821a, 821b, and 811b in a solution that is to be an isolation matrix and then coagulating the solution. The isolation matrix 830 may be formed of a solid polymer electrolyte or a gel polymer electrolyte.

The first through fourth structures 811a, 821a, 821b, and 811b pass through the isolation matrix 830. The electrode assembly 800 is different from the electrode assembly 700 in that the electrode assembly 800 further includes the third structures 821b that extend in an x direction on the same plane as the first structures 811a extending in the x direction to alternate with the first structures 811a and have polarity opposite to polarity of the first structures 811a. Likewise, the electrode assembly 800 further includes the fourth structures 811b that extend in a y direction on the same plane as the second structures 821a passing through the isolation matrix 830 and extending in the y direction to alternate with the second structures 821a and have polarity opposite to polarity of the second structures 821a. One cathode and an anode may be provided outside a battery by combining structures having the same polarity, or a bipolar battery may be provided by coupling structures having opposite polarities in the battery.

The embodiments may be combined unless being contradictory without departing from the scope of the invention. For example, in the electrode assembly 600 of FIG. 7, the isolation matrix 730 (see FIG. 8) may be used instead of the separator 630, and the first and second structures 111 and 121 which are weft threads and warp threads illustrated in the right image of FIG. 7 may be buried as at least one layer in the isolation matrix 730. Also, in the electrode assembly 500 of FIG. 6C, the first and second structures 511x and 511y may cross each other as weft threads and warp threads, and the third and fourth structures 521w and 521z may cross each other as weft threads and warp threads. In this case, a solid electrolyte layer may be selectively further formed only on any one electrode, preferably, an electrode whose volume change during charging/discharging is the smaller electrode among the cathode 510M including the structures 511x and 511y and the anode 520M including the structures 521w and 521z. Also, it would be understood that two or more structures having different arrangements may be combined.

Figure 10:
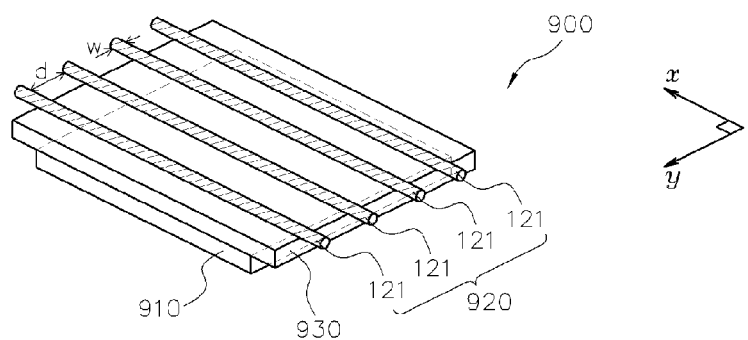
FIG. 10 is a perspective view illustrating an electrode assembly according to another embodiment of the present invention.

FIG. 10 is a perspective view illustrating an electrode assembly 900 according to another embodiment of the present invention.

Referring to FIG. 10, the electrode assembly 900 constituting a battery includes a first electrode 920 including a plurality of first structures 121 having fibrous shapes, and a second electrode 910 having a planner shape and a polarity opposite to polarity of the first structures 121. The second electrode 910 facing the first electrode 920 including the first structures 121 is different from other fibrous structures in that the second electrode 910 has a planner shape.

A thickness w of each of the first structures 121 may range from 400 μm to 2,000 μm, and may be appropriately determined according to a field to which the battery is applied. A distance d between the first structures 121 may be greater than 0 μm and less than 1,000 μm, and preferably from 2 μm to 400 μm. In order to increase an interfacial surface area between the first and second electrodes 920 and 910, the distance d may be greater than 0 μm and less than the thickness w of each of the first structures 121.

A separator 930 is provided between the first electrode 920 and the second electrodes 910. The separator 930 may be a micro-porous film, a woven fabric, a nonwoven fabric, an intrinsic solid polymer electrolyte film, or a gel solid polymer electrolyte film as described above. The intrinsic solid polymer electrolyte film may include a straight chain polymer material or a cross-linked polymer material. The gel polymer electrolyte film may be any one of a plasticizer-containing polymer including salt, a filler-container polymer, and a pure polymer, or a combination thereof.

The first structures 121 extending in parallel in one direction may be electrically connected to one another to constitute one electrode, for example, a cathode. In this case, the second electrode 910 having the planner shape may be an anode.

FIG. 11 is a perspective view illustrating an electrode assembly 1000 according to another embodiment of the present invention.

Referring to FIG. 11, the electrode assembly 1000 is different from the electrode assembly 900 of FIG. 10 in that the first structures 121 further extend to surround a second electrode 1010 and thus to face both main surfaces of the second electrode 1010 having a planner shape. In order to separate a first electrode 1020 including the first structures 121 from the second electrode 1010 having the planner shape, separators 1030a and 1030b may be disposed between the first structures 121 and the both main surfaces of the second electrode 1010. A plurality of separators may be provided as shown in FIG. 11, and one planner separator may be folded to contact the both main surfaces of the second electrode 1010. Alternatively, a separator may be provided by providing an intrinsic solid polymer electrolyte or a gel solid polymer electrolyte to surround the second electrode 1010.

Since the first structures 121 are wound around the both main surfaces of the second electrode 1010, an interfacial surface area between the first and second electrodes 10120 and 1010 may be increased. Accordingly, energy density in the same volume may be improved, and charge/discharge efficiency and battery cycle characteristics may also be improved. Although the first structures 121 surround the second electrode 1010 by being wound one time in FIG. 11, the first structures 121 may be wound two or more times without departing from the scope of the present invention. In this case, only one first structure, instead of a plurality of first structures, may be provided by being spirally wound.

FIG. 12 is a perspective view illustrating an electrode assembly 1100 according to another embodiment of the present invention.

Referring to FIG. 12, an electrode 1121M of the electrode assembly 1100 includes a plurality of fibrous structures 1121x and 1121y having the same polarity and crossing each other. The plurality of fibrous structures 1121x and 1121y having the same polarity may contact each other to form a grid structure. Another electrode 1110 of the electrode assembly 1000 has a planner shape like the second electrode 910 of FIG. 10. The electrode 1121M may be an anode and the electrode 1110 may be a cathode. A separator 1130 is provided between the electrode 1121M including the structures 1121x and 1121y and the electrode 1110 having the planner shape.

FIG. 13 is a perspective view illustrating an electrode assembly 1200 according to another embodiment of the present invention.

Referring to FIG. 13, the electrode assembly 1200 includes first structures 121a and further includes second structures 121b that extend in a direction different from a direction in which the first structures 121a extend to cross the first structures 121a and have the same polarity as that of the first structures 121a, when compared to the electrode assembly 1100 of FIG. 12. However, in FIG. 13, the first structures 121a and the second structures 121b cross each other as weft threads and warp threads.

Another electrode 1210 of the electrode assembly 1200 has a planner shape. The electrode 1210 is a cathode, and the electrode 1220 including the first and second structures 121a and 121b is an anode. A separator 1230 is provided between the electrode 1210 having the planner shape and the electrode 1220 including the structures 121a and 121b.

After electrode assemblies are formed, a separator or an isolation matrix may be impregnated in an appropriate electrolyte to be activated. Alternatively, when the separator or the isolation matrix is formed of a gel or intrinsic solid polymer electrolyte, the separator or the isolation matrix may be activated without being impregnated.

As described above, since at least one of a cathode and an anode includes a plurality of fibrous structures, an interfacial surface area between electrodes may be increased and an electrode assembly which is thin and whose shape is easily changed may be easily made. It would be understood by one of ordinary skill in the art that the embodiments may be combined unless being contradictory without departing from the scope of the present invention. For example, in FIG. 13, first and second structures crossing each other as weft threads and warp threads may extend to reciprocate through a separator.

A battery whose shape is easily changed may be provided by changing shapes of fibrous structures whose shapes may be easily changed, adjusting areas of the structures to adjust capacity, and folding, bending, or stacking the structures. For example, the battery may be used as a small battery by being attached to clothes, bags, etc., or may be used as a large or medium battery of vehicles by having high capacity.

Also, according to the embodiments, since a interfacial area is increased in a 3D manner and charge/discharge efficiency is improved, a battery may be manufactured by using a small amount of cathode material. In the case of a lithium ion battery, considering its limited reserves, according to the embodiments, a battery that may obtain the same energy with less lithium may be provided.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An electrode assembly comprising:
a first electrode comprising a plurality of first structures that have fibrous shape and extend in a first direction;
a second electrode comprising a plurality of second structures that have fibrous shape and polarity opposite to polarity of the first structures, and extend in a second direction different from the first direction;
a first separator that is disposed between the first structures and the second structures which cross each other, and separates the first structures from the second structures;
a third electrode comprising a plurality of third structures that have fibrous shape and polarity opposite to the polarity of the first structures, and extend on the first main surface of the first separator in the first direction to alternate with the first structures; and
a fourth electrode comprising a plurality of fourth structures that have fibrous shape and polarity opposite to the polarity of the second structures, and extend on the second main surface of the first separator in the second direction to alternate with the second structures,
wherein the third structures and the fourth structures which cross each other are separated from each other by the first separator.

2. The electrode assembly of claim 1, wherein the first structures extend on a first main surface of the first separator to be spaced apart from one another, and the second structures extend on a second main surface of the first separator which is opposite to the first main surface to be spaced apart from one another.

3. The electrode assembly of claim 1, wherein at least some of the first through fourth structures are partially or totally buried in the first or second main surface of the first separator.

4. The electrode assembly of claim 1, further comprising:
at least one second separator that is stacked on the first separator to form a multi-layered structure;
a fifth electrode comprising a plurality of fifth structures that extend on a main surface of the second separator which is opposite to an interface between the first separator and the second separator, and have fibrous shape and polarity opposite to polarity of structures on the interface, wherein the fifth structures and the structures on the interface cross each other; and
a sixth electrode comprising a plurality of sixth structures that have fibrous shape and polarity opposite to the polarity of the fifth structures, extend on the other main surface of the second separator to alternate with the fifth structures, wherein the sixth structures and the structures on the interface cross each other.

5. The electrode assembly of claim 4, wherein at least some of the first through sixth structures are partially or totally buried in the first or second separator.

6. The electrode assembly of claim 1, wherein a thickness of each of the first and second structures ranges from 400 μm to 2,000 μm, and a distance between the first and second structures ranges from 2 μm to 400 μm.

7. The electrode assembly of claim 1, wherein a distance between the first and second structures is less than a thickness of each of the first and second structures.

8. The electrode assembly of claim 1, wherein the first separator comprises any one of a micro-porous film, a woven fabric, a nonwoven fabric, an intrinsic solid polymer electrolyte film, a gel solid polymer electrolyte film, and a combination thereof.

9. The electrode assembly of claim 1, wherein the electrode assembly is used for a primary battery or a secondary battery.

10. An electrode assembly comprising:
a first electrode comprising a plurality of first structures that have fibrous shape and extend in a first direction;
a second electrode comprising a plurality of second structures that have fibrous shape and polarity opposite to polarity of the first structures, and extend in a second direction different from the first direction; and a first separator that is disposed between the first structures and the second structures which cross each other, and separates the first structures from the second structures, wherein each of the first structures and the second structures comprises a current collector core and an active material layer that surrounds the current collector core, wherein only ones of the first structures and the second structures selectively further comprise a solid electrolyte layer that surrounds the active material layer.

11. An electrode assembly comprising:

a first electrode comprising a plurality of first structures that have fibrous shapes and extend in a first direction;

a second electrode that has a planar shape and a polarity opposite to polarities of the first structures; and a separator that is disposed between the first electrode and the second electrode, wherein the first structures and the second structures cross each other as weft threads and warp threads, wherein the first and second structures reciprocate through the separator.

12. The electrode assembly of claim 11, further comprising a third electrode comprising a plurality of second structures that have fibrous shape and the same polarity as the polarity of the first structures, and extend in a second direction different from the first direction to cross the first structures.

13. The electrode assembly of claim 11, wherein the first structures further extend to surround both main surfaces of the second electrode.

14. The electrode assembly of claim 11, wherein a thickness of each of the first structures ranges from 400 μm to 2,000 μm, and a distance between the first structures ranges from 2 μm to 400 μm.

15. The electrode assembly of claim 11, wherein a distance between the first structures is less than a thickness of each of the first structures.

16. An electrode assembly comprising:

a first electrode comprising a plurality of first structures that have fibrous shape and extend in a first direction;

a second electrode comprising a plurality of second structures that have fibrous shape and polarity opposite to polarity of the first structures, and extend in a second direction different from the first direction; and a first separator that is disposed between the first structures and the second structures which cross each other, and separates the first structures from the second structures, wherein the first structures and the second structures cross each other as weft threads and warp threads reciprocating through the first separator.

17. An electrode assembly comprising:

a first electrode comprising a plurality of first structures that have fibrous shape and extend in a first direction, and a plurality of second structures that have fibrous shape and the same polarity as polarities of the first structures and extend in a second direction different from the first direction to cross the first structures;

a second electrode comprising a plurality of third structures that have fibrous shape and extend in a third direction, and a plurality of fourth structures that have fibrous shape and the same polarity as polarity of the third structures and extend in a fourth direction different from the third direction to cross the third structures; and a first separator that separates the first electrode from the second electrode, wherein only one of a group of the first and second structures and a group of the third and fourth structures selectively further comprises a solid electrolyte layer.

18. The electrode assembly of claim 17, wherein the first electrode and the second electrode are rotated or offset such that the first electrode and the second electrode are not symmetrical with each other.

19. The electrode assembly of claim 17, wherein the first and second structures cross each other as weft threads and warp threads, and the third and fourth structures cross each other as weft threads and warp threads.

20. The electrode assembly of claim 17, wherein each of the first structures and the second structures comprises a current collector core and an active material layer that surrounds the current collector core.

\* \* \* \* \*